United States Patent [19]
Chiou et al.

[11] 3,958,255
[45] May 18, 1976

[54] INK JET NOZZLE STRUCTURE

[75] Inventors: Charles Chiou, San Jose; Guido Galli, Saratoga; Karl H. Loeffler, San Jose; Max R. Lorenz, Saratoga, all of Calif.

[73] Assignee: International Business Machines Corporation, Armonk, N.Y.

[22] Filed: Dec. 31, 1974

[21] Appl. No.: 537,795

[52] U.S. Cl. .............................. 346/140 R; 156/11; 239/601; 346/75
[51] Int. Cl.² .................................... G01D 15/18
[58] Field of Search ............. 346/140, 75; 239/601; 29/157 C

[56] References Cited
UNITED STATES PATENTS
3,823,408   7/1974   Gordon .............................. 346/140

OTHER PUBLICATIONS
Lane, R; Fabricating an Ink Jet Nozzle; IBM Tech. Disc. Bulletin, Vol. 16, No. 10, Mar. 1974, p. 3413.

*Primary Examiner*—Joseph W. Hartary
*Attorney, Agent, or Firm*—John H. Holcombe

[57] ABSTRACT

A nozzle array structure for pressurized fluid jets includes a uniform deposited membrane having an array of uniform small orifices therein overlaying a planar substrate having an array of larger aperture openings therethrough with approximately the same central axes as the orifice array. The method of making includes forming a substrate of a planar single crystal material oriented with the (100) planes parallel to the surface. A membrane comprising a uniform coating of an inorganic material is applied to the planar surface of the substrate. The substrate is preferentially etched from the rear surface to form an array of openings therein extending therethrough to the membrane. The membrane is then selectively eroded to form an array of uniform small orifices therein.

8 Claims, 3 Drawing Figures

INK JET NOZZLE STRUCTURE

BACKGROUND OF THE INVENTION

The need for high-quality, high-speed computer printers and other types of output printers with changeable formats has been evidenced in recent years. Developments have proceeded with respect to ink jet technology to answer this need. Most developments in the field of ink jet have related to pressure deflected systems such as taught by Sweet U.S. Pat. No. 3,596,275, wherein a single stream of ink droplets are selectively charged and passed through a uniform deflection field to impact various locations on a recording medium in accordance with the charge of each droplet. Thus, by applying suitable charging signals to the droplets, a visible human-readable printed record may be formed on the recording surface. This type of system requires very precise control over the charge placed on each droplet due to various factors such as the tendancy of similarly charged droplets closely adjacent to one another to repel each other and therefore impact the recording medium at unintended locations. The circuitry required to accomplish this precise control appears to be relatively expensive, especially when duplicated for each jet of a multi-jet printer, which is required to attain truly high speeds.

Another type of ink jet printing has been developed which offers the potential of attaining high-speed, high-quality variable printing without requiring the expensive precision charging control electronic circuitry. This type of printing may be called the binary pressure type and is shown in Sweet et al, U.S. Pat. No. 3,373,437. This type of system generates a plurality of jets in one or more rows, selectively charging drops with a single charge signal for deflection by a constant field to an ink drop catcher. The uncharged drops continue along the original jet stream path to impact a recording medium. The precision control over charging is not required inasmuch as charged drops impact the gutter and not the recording medium. In the absence of selective deflection, the major disadvantage of this type of ink jet printing has been that one nozzle orifice is required for each printing position across the entire dimension of the path to be printed in a single pass. This requires the fabrication of a vast number of nozzle orifices for a single printer. Examples of ink jet heads designed for this type of printing are Beam et al. U.S. Pat. No. 3,586,907 and Mathis U.S. Pat. No. 3,701,998. A method for fabrication of orifices with this type of ink jet head is shown in Taylor U.S. Pat. No. 3,655,530. This method involves the electroplating of the interior of predrilled holes until sufficient material has been plated thereon to reduce the orifice diameter to the desired size. This type of fabrication does not appear to lend itself to an extremely closely spaced linear array of orifices.

High quality printing requires that the individual drops and the spots resulting from impact of the drops on the recording medium be sufficiently small and closely spaced so as to be relatively indiscernible as individual drops, but rather discernible only as part of the resultant printed symbol. This may require the printing of 200 or more drops to the linear inch, each spot being approximately less than seven mils in diameter. To achieve this arrangement with a double row head, wherein the orifices of one row are interleaved with respect to the orifices of the other row as shown in above U.S. Pat. No. 3,701,998, would require orifices no larger than 2 mils in diameter to be spaced no wider than 10 mils from center to center along a single row.

An object of the present invention is to provide an ink jet nozzle structure having an extremely closely spaced array of small orifices.

Another object of the present invention is to provide a method for making an ink jet nozzle structure having a closely spaced array of small orifices.

A major difficulty involved is the fact that the ink or fluid to form the jet must be pressurized and forced through the orifices at relatively high velocities. Any ink jet nozzle structure must therefore be constructed to withstand such pressure and velocities over a long period of time without significant wear or cracking over an extended period of time.

SUMMARY OF THE INVENTION

Briefly, a multi-orifice nozzle array structure is provided for pressurized fluid jets. The structure includes a deposited membrane of relatively uniform thickness and having an array of uniform small orifices therein, the membrane comprising an inorganic material. The deposited membrane overlays a planar substrate having an array of larger diameter entrance openings therethrough with approximately the same central axes as the orifices. The method of making the multi-orifice nozzle array structure includes forming a planar single crystal substrate oriented with the (100) planes parallel to the surface. The membrane, comprising a uniform coating of an inorganic material, is then applied to the planar surface of the substrate. The substrate is preferentially etched from the rear surface to form an array of openings therethrough extending to the membrane, the etchant having a minimal effect on the membrane. The membrane is then selectively eroded to form an array of uniform small orifices therein, each communicating with a corresponding entrance opening in the substrate and having approximately the same central axis therewith. By having a membrane, various orifice opening techniques may be employed for batch fabrication of multi-orifice nozzle arrays.

A feature of the subject invention is that the nozzle array may also be employed with multi-orifice ink jet systems wherein drops are selectively deflected by a switchable deflection field rather than by selective charging. An example of such a system comprises Dill et al. U.S. patent application Ser. No. 485,409 entitled "Method and Apparatus for Recording Information on a Recording Surface," which describes a multi-orifice magnetic ink jet system.

Another feature of the present invention is that it may be employed as a nozzle plate in either the forward or reverse direction. When in the reverse direction, the structure is less affected by imperfections, defects, or residues, and is mechanically stronger.

The foregoing and other objects, features and advantages of the invention will be apparent from the following more particular description of a preferred embodiment of the invention, as illustrated in the accompanying drawings.

DESCRIPTION OF A PREFERRED EMBODIMENT

Multi-orifice binary pressure ink jet systems offer the potential of avoiding the extensive and costly charging control or deflection control mechanisms of pressure deflected ink jet systems. The major difficulty of the multi-orifice binary pressure systems is the nozzle plate structure which must comprise a series of rows of closely spaced small orifices which are uniform, resistant to cracking under pressure, and resistant to wear from the ink expelled at high velocity through the orifices. It is this problem that is solved by the structure of the present invention, which is manufacturable by batch fabrication.

Figure 1:
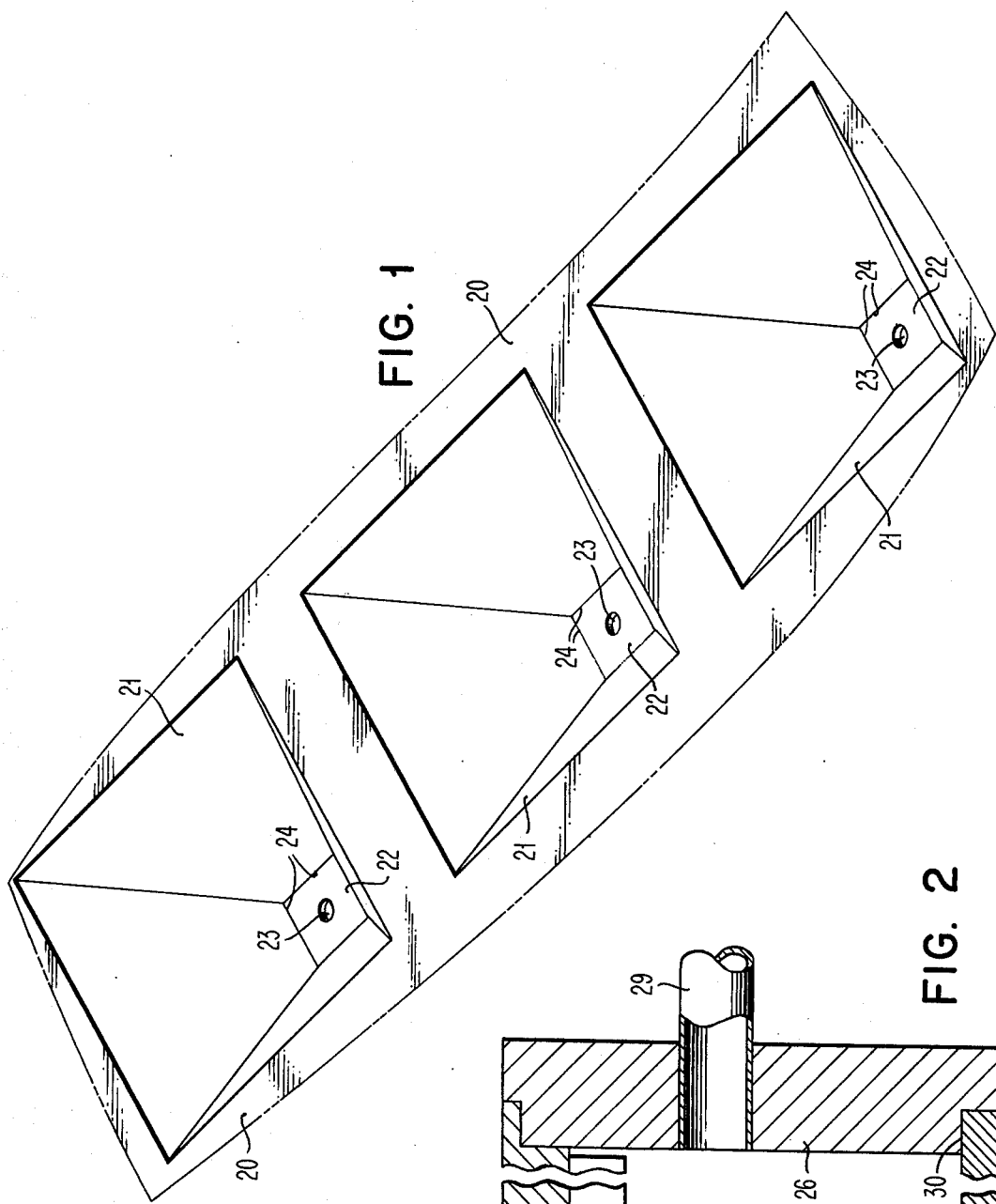
FIG. 1 is a perspective view of a portion of the nozzle plate structure of the present invention.

Referring to FIG. 1, a portion of the nozzle plate of the present invention is illustrated schematically as viewed from the rear. Specifically, a substrate 20 is illustrated having a uniformly spaced array of uniform openings 21 therethrough. The openings extend completely through the substrate to an inorganic membrane 22. The membrane is punctured by a uniform array of uniform orifices 23. The orifices are arranged in the same linear array as the openings 21 and each orifice is approximately centered about the same central axis as the corresponding opening 21.

As an example of a specific configuration, the silicon substrate may be about 7 mils in thickness and the membrane 22 may be about 0.2 mil thick. The intersection of opening 21 with membrane 22 along lines 24 may form an opening of approximately 2 mils. In such a configuration, the diameter of orifice 23 may be as small as 0.4 or 0.5 mils. The spacing of orifices 23 is dependent upon the expected coverage of the spots generated by the ink jet drops and by the number of rows of orifices, but the orifices in a single row may be compacted to within a distance of 12 mils from center to center.

With a substrate of single crystal silicon and a membrane of silicon dioxide ($SiO_2$), the average maximum burst pressure has been calculated to be about 15,000 PSI.

By means of the at least approximately 4 to 1 ratio between the width of opening 21 and intersection 24 and the diameter of orifice 23, the nozzle aspect ratio becomes the ratio of the thickness of membrane 22 vs. the diameter of hole 23. In the given example, the aspect ratio of orifice 23 is on the order of 0.5:1. As discussed in Gordon U.S. Pat. No. 3,823,408, aspect ratios on the order of 0.5:1 have proven highly advantageous.

Figure 2:
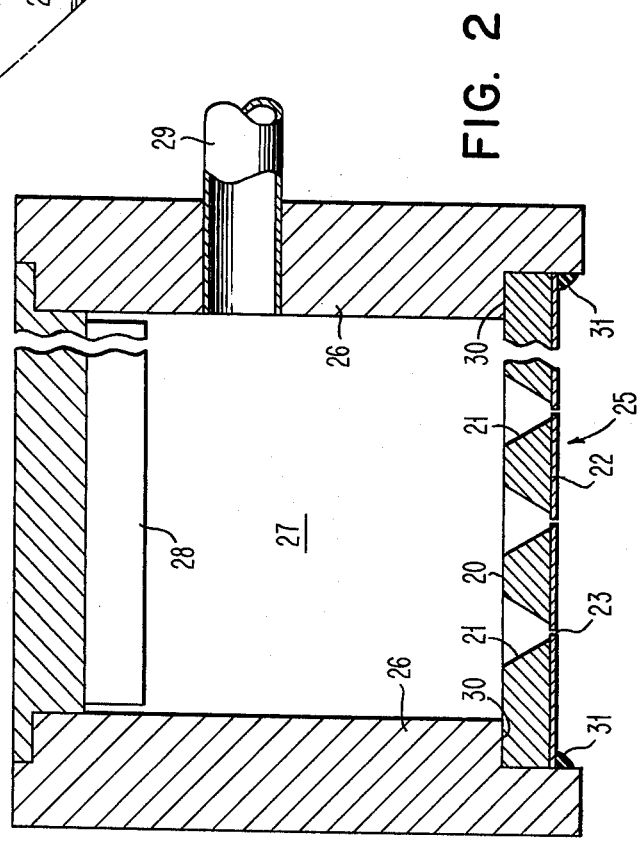
FIG. 2 is a schematic showing of an ink jet head structure incorporating the nozzle plate of the present invention.

The nozzle plate of FIG. 1 is shown in FIG. 2 mounted in an ink jet head structure. Reference numeral 25 denotes the nozzle plate of FIG. 1. It is mounted in a head support structure 26 which encloses an ink manifold and includes a vibrating mechanism 28 such as a piezoelectric crystal or magnetostrictive transducer or the like mounted at the rear of the support structure. The chamber 22 has a supply tube 29 connected thereto for supplying the ink to the chamber under a suitable pressure, such as 80 PSI. The head support structure 26 includes a shoulder portion 30 to provide a seat for the nozzle plate 25, which may be secured to the support structure by cementing along the frontal edge 31. The ink under pressure in the cavity 27 is perturbated by transducer 28 so as to synchronize the formation of drops by the jet streams emanating from orifices 23 at a uniform frequency and predictable phase and size.

The substrate 20 of nozzle plate 25 has been found to be best formed from single crystal silicon. The membrane 22 may be made of several materials, such as silicon dioxide ($SiO_2$), glassy materials such as "Pyrex," polycrystalline silicon, silicon nitride, or other suitable materials.

FIG. 2 illustrates nozzle plate 25 emplaced in the forward direction. In certain circumstances, such as high pressure, e.g., 120 PSI, usage, it is advantageous to emplace the plate 25 in the reverse direction. When in the reverse direction, the structure and the resultant ink jet are less affected by imperfections, defects, or residues behind the orifice. Since the monocrystalline silicon is not in contact with the ink, the structure additionally is able to better resist etching by the ink. The structure is also mechanically stronger. However, the anisotropically etched substrate does not present a smooth surface on which may be placed circuitry, for example, for drop synchronization.

Figure 3:
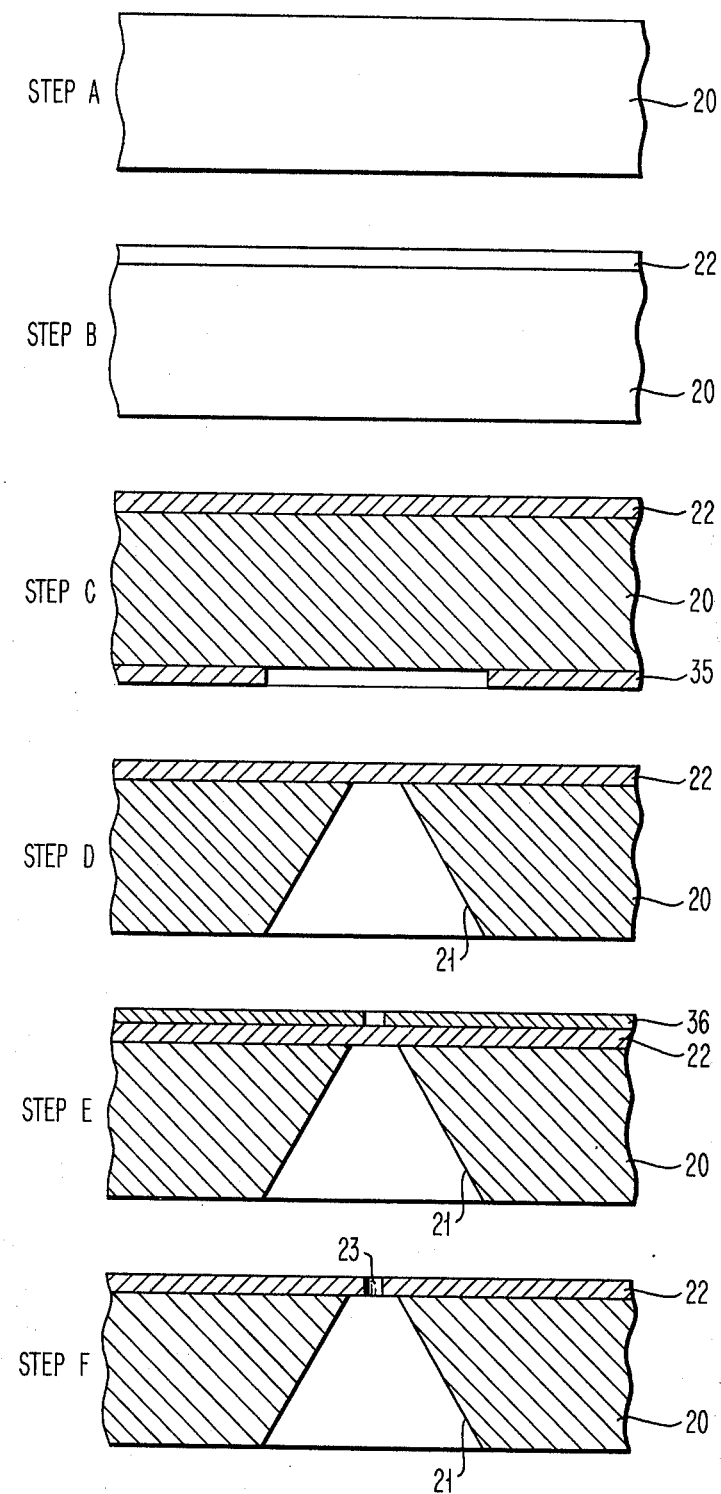
FIG. 3 is a flow diagram in cross section, illustrating the steps for fabricating the nozzle plate of FIG. 1.

FIG. 3 illustrates the method of making the nozzle plate 25. Generally, the method of making the nozzle plate 25 comprises providing a substrate of a single crystal material, such as silicon, oriented with the (100) planes parallel to the surface, as shown in Step A. A membrane comprising a uniform coating of an inorganic material is applied to the planar surface of the substrate as shown in Step B. Steps C and D comprise the anisotropic etching of the substrate from the rear surface to form an array of openings therein extending to the membrane 22. In this description, the words "anisotropic" and "preferential" are used interchangeably, having the same meaning. Steps E and F illustrate the selective erosion of the membrane 22 to form a uniform array of small orifices 23 each having their central axis approximately concentric with the central axis of the opening 21.

More specifically referring to FIG. 3, Step A comprises the provision of a monocrystalline silicon substrate slice having a (100) crystallographic orientation. Techniques for providing a semiconductor slice of this type are well known and need not be specifically described for purposes of the present disclosure.

Step B comprises the provision of the membrane layer of about .2 mil thickness on the substrate 20. Various materials may be utilized as discussed above. If silicon dioxide or silicon nitride is used as the membrane material at 2 to 6 microns in thickness, it is preferably prepared preferably either by chemical vapor deposition, by sputter deposition, or as a thermally grown oxide. Each of these processes is well known in the art and need not be specifically described here. The polycrystalline silicon membrane is best prepared by chemical vapor deposition or by electron beam deposition. Again, these techniques are well known in the art. The "Pyrex" film membrane is preferably formed by sputter deposition.

Steps C and D represent the formation of the aperture holes 21 in the monocrystalline substrate. A suitable mask material 35 may be formed in Step C to control the location and orientation of the etching of the substrate in Step D. The entrance holes 21 are preferentially etched in the (100) single crystal silicon using a water amine pryocatechol etchant or other basic etchants. It has been known for some time that the (111) plane is a slow etch plane in single crystalline silicon material. Thus, the etching of Step D produces a pyramidal hole in the substrate having as its surface the (111) plane. The pyramid becomes truncated upon encountering the membrane 22 as the etching expands the pyramid laterally. The precision etching of monocrystalline materials in this manner is now an established technique and is discussed extensively in the art, for example, in Kragness et al. U.S. Pat. No. 3,765,969.

Preferential etching is also discussed in the article by Sedgwick et al, Journal of the Electrochemical Society, Vol. 119, No. 12, Dec. 1972, entitled "A Novel Method for Fabrication of Ultrafine Metal Lines by Electron Beams."

Steps E and F represent formation of the orifices 23 in the membrane 22 by chemical etch, sputter etch, ion etch or plasma etch through an appropriate selection of photoresist mask and/or metal mask 36. Electron beam lithography may be used in place of conventional photolithography where the resolution or definition of the orifices 23 becomes extremely critical. Photolithographic masking and etching techniques are well known and conventional and need not be discussed here.

By having a membrane in conjunction with a substrate, various orifice opening techniques can be employed for batch fabricating reproducible multi-orifice nozzle arrays. Batch fabrication refers to the simultaneous production of several sets of nozzle plates on a single and/or several wafers. For example, chemical etching is preferred for the silicon dioxide membrane, and plasma etching or reactive sputter etching is preferred for the silicon nitride membrane. Both these approaches lend themselves to batch fabrication in reproducible multi-orifice nozzle arrays.

From the above description it is apparent that a new nozzle plate is provided which is usable for high-quality, high-resolution and high-speed ink jet printing of the binary pressure type.

While the invention has been particularly shown and described with reference to a particular embodiment thereof, it will be understood by those in the art that the above and various changes in the form and details may be made therein without departing from the spirit and scope of the invention.

What is claimed is:
1. In a multi-orifice fluid jet head including a source of pressurized fluid, and manifold means communicating with said source, the improvement comprising:
 a multi-orifice nozzle plate communicating with said manifold means and comprising
 a planar monocrystalline substrate having a uniform array of aperture openings therethrough for said fluid; and
 a deposited membrane of uniform thickness less than 1 mil coating and overlaying said substrate and having an array of uniform orifices therein for said fluid,
 said orifices having approximately the same central axes as said aperture openings, and having smaller areal cross sections than said aperture openings.

2. The fluid jet head improvement of claim 1 wherein said deposited membrane is additionally an inorganic material.

3. The fluid jet head improvement of claim 2 wherein said aperture opening and orifice arrays additionally comprise at least one straight linear array of approximately equally spaced common openings and orifices.

4. The fluid jet head improvement of claim 3 wherein said spacing of said common openings and orifices is 0.02 inches or less.

5. The fluid jet head improvement of claim 4 wherein said orifices additionally have a diameter of 0.002 inches or less.

6. The fluid jet head improvement of claim 5 wherein said deposited membrane is additionally a compound of silicon.

7. The fluid jet head improvement of claim 6 wherein said monocrystalline substrate is silicon.

8. The fluid jet head improvement of claim 7 wherein said aperture openings additionally comprise an average areal cross section at the intersection thereof with said membrane of at least approximately four times the average areal cross section of said orifices.

* * * * *